United States Patent [19]

Anderson et al.

[11] Patent Number: 5,139,800
[45] Date of Patent: Aug. 18, 1992

[54] BROWNING COMPOSITION AND PROCESS FOR BROWNING FOODS

[75] Inventors: James M. Anderson, Uncasville; Ping W. Chang, Waterford; Christopher A. Macri, Old Lyme; James W. Miller, Ledyard; Divina V. Sarges, Mystic, all of Conn.

[73] Assignee: Pfizer Inc, New York, N.Y.

[21] Appl. No.: 608,511

[22] Filed: Nov. 2, 1990

[51] Int. Cl.⁵ ............................................. A23L 1/00
[52] U.S. Cl. .............................. 426/243; 426/250; 426/540; 426/305; 426/307
[58] Field of Search ............... 426/540, 250, 262, 305, 426/307, 601, 243

[56] References Cited

U.S. PATENT DOCUMENTS

| | | | |
|---|---|---|---|
| 3,406,081 | 10/1968 | Bauer et al. | 426/310 |
| 3,483,002 | 12/1969 | Stein | 426/250 |
| 3,586,512 | 6/1971 | Mamcuso et al. | 426/250 |
| 3,734,745 | 5/1973 | Cassanelli et al. | 426/540 |
| 4,252,332 | 2/1981 | Moody | 426/241 |
| 4,330,566 | 5/1982 | Meyer et al. | 426/606 |
| 4,448,791 | 5/1984 | Fulde | 426/94 |
| 4,518,618 | 5/1985 | Hsia | 426/262 |
| 4,555,605 | 11/1985 | Brown | 219/10.55 |
| 4,590,349 | 5/1986 | Brown | 219/10.55 |
| 4,594,492 | 6/1986 | Maroszek | 219/10.55 |
| 4,626,641 | 12/1986 | Brown | 219/10.55 |
| 4,640,887 | 2/1987 | Coleman | 424/94 |
| 4,735,812 | 4/1988 | Bryson | 426/262 |
| 4,759,936 | 7/1988 | Best et al. | 426/540 |
| 4,814,568 | 3/1989 | Keefer | 219/10.55 |
| 4,833,007 | 5/1989 | Huang | 428/242 |
| 4,844,934 | 7/1989 | Lueddecke et al. | 426/540 |
| 4,882,184 | 11/1989 | Buckholz | 426/243 |
| 4,904,490 | 2/1990 | Buckholz | 426/243 |
| 4,963,376 | 10/1980 | Nafisi-Mouaghar | 426/243 |
| 5,002,789 | 3/1991 | Graf et al. | 426/540 |
| 5,023,095 | 6/1991 | Kirk | 426/250 |

FOREIGN PATENT DOCUMENTS

| | | |
|---|---|---|
| 005290 | 11/1979 | European Pat. Off. . |
| 669363 | 2/1952 | United Kingdom . |
| 2038607 | 7/1980 | United Kingdom . |
| 9012513 | 11/1990 | World Int. Prop. O. . |

OTHER PUBLICATIONS

Kulp K. and Loewe R., Batters and Breadings In Food Processing, Amer Assoc of Cereal Chemists, 1991, pp. 119–125.

*Primary Examiner*—George Yeung
*Attorney, Agent, or Firm*—Peter C. Richardson; Paul H. Ginsburg; Robert F. Sheyka

[57] ABSTRACT

There is disclosed a browning composition for uncooked foods comprising a colorant and a fat or an oil. Also disclosed is a process for imparting a brown color to cooked foods by using the composition of the present invention on foods cooked, for example, in a microwave oven.

67 Claims, No Drawings

BROWNING COMPOSITION AND PROCESS FOR BROWNING FOODS

BACKGROUND OF THE INVENTION

The present invention relates to food browning compositions and a process for browning foods. The composition may be used to brown foods cooked either by microwave radiation or by conventional means.

When foods are prepared quickly, particularly in those cases wherein the food is either cooked by microwave radiation or warmed for a short period of time in a conventional oven or by other means, the surface of the food lacks the brown color and often the associated aroma produced by conventional cooking methods. The pale appearance of foods such as chicken, pork, beef and cakes is unappealing to consumers.

In the case of microwaved foods, browning has been achieved primarily by using packaging material containing metal susceptors for inducing local heating. These susceptors are in contact with the surface of the food and upon heating to a certain temperature, browning of the surface is accomplished. Such packaging is referred to in e.g. U.S. Pat. Nos. 4,833,007, 4,814,568, 4,626,641, 4,594,492, 4,590,349 and 4,555,605.

One approach to browning microwaved meat products such as poultry, beef, pork, fish and other foods has been to apply a brown-colored sauce or topping to the food before cooking or serving.

One such sauce is referred to in U.S. Pat. No. 4,252,832 to Moody. This is a thick syrup prepared by melting, caramelizing and foaming a granular disaccharide such as sucrose, maltose or lactose.

U.S. Pat. No. 4,640,837 to Coleman et al. refers to a coating composition for imparting a crisp golden brown surface to microwaved foods. The coating comprises a toasted bread crumb/oil blend in amounts up to 66 percent by weight of the composition, maltodextrin, soy protein concentrate and pre-gelatinized starch.

U.S. Pat. No. 4,518,618 to Hsia refers to a food coating composition comprising a combination of three salts, i.e. potassium acetate, potassium chloride and potassium bicarbonate or potassium acetate, potassium chloride and sodium bicarbonate.

U.S. Pat. No. 4,448,791 to Fulde refers to a reactive dough surface which undergoes chemical surface browning upon exposure to microwave radiation. The reactive composition contains as the essential active ingredient a reducing sugar such as dextrose and an amino acid source such as a yeast extract.

U.S. Pat. No. 4,735,812 to Bryson refers to a browning composition comprising collagen or gelatin hydrolyzed to its constituent amino acids plus one or more reducing sugars.

U.S. Pat. No. 4,882,184 to Buckholz refers to a microwave browning process comprising Maillard reaction precursors such as proline and rhamnose or ribose, and a solvent which is a mixture of glycerin and ethyl alcohol.

U.S. Pat. No. 4,904,490 to Buckholz refers to a microwave browning process comprising Maillard reaction precursors such as lysine and rhamnose or ribose, and a solvent which is a mixture of glycerin and ethyl alcohol.

SUMMARY OF THE INVENTION

In one embodiment, the present invention is directed to an edible composition comprising:

(a) a dispersed phase consisting essentially of a colorant or a colorant substantially dissolved or dispersed in a substantially oil-immiscible medium; and (b) a continuous phase consisting essentially of an edible fat or an oil;

wherein said composition imparts a brown color to foods upon cooking.

Preferred is the composition wherein said colorant is present in an amount of from about 0.05 to about 10 percent by weight, preferably at from about 0.2 to about 6 percent by weight.

Preferred also is the composition wherein said colorant is selected from the group consisting of caramel, paprika, food grade dyes, beet powder, carmine, water-soluble annatto, turmeric, and saffron; and combinations thereof; with an especially preferred colorant being caramel.

Also preferred is the composition wherein said fat or oil is present at a concentration of from about 10 to about 99 percent by weight, preferably at from about 40 to about 70 percent by weight.

Especially preferred is the composition wherein said fat or oil is selected from the group consisting of canola oil, soybean oil, corn oil, olive oil, peanut oil, safflower oil, sunflower oil, vegetable oil, partially hydrogenated vegetable oils, animal fats, and milkfat; and combinations thereof; with preferred oils being canola oil and soybean oil.

Also preferred is the composition further comprising the addition of an emulsifier, with preferred emulsifiers selected from the group consisting of mono- and diglycerides and diacetyltartaric acid esters of mono- and diglycerides; and combinations thereof; with said emulsifier present at a concentration of from about 0.1 to about 10 percent, preferably at from about 1 to about 8 percent.

Also further preferred is the composition further comprising the addition of a viscosifying agent, with the viscosifying agent present at a concentration of from about 0.01 to about 1 percent by weight, preferably at from about 0.05 to about 0.4 percent by weight.

Preferred viscosifying agents are selected from the group consisting of xanthan gum, guar gum, starch, flour, gelatin, pectin, agar, carrageenan, alginates, locust bean gum, methyl cellulose, hydroxypropyl cellulose, hydroxypropylmethyl cellulose, carboxymethyl cellulose, ethyl cellulose, and methylethyl cellulose; and combinations thereof; with especially preferred viscosifying agents being xanthan gum, guar gum, and starch.

Still further preferred is the composition further comprising the addition of a film-forming agent, with said film-forming agent present at a concentration of from about 0.01 to about 1.0 percent by weight, preferably at from about 0.05 to about 0.4 percent by weight.

Preferred film-forming agents are selected from the group consisting of hydroxypropyl cellulose, methyl cellulose, arabinogalactan, hydroxypropylmethyl cellulose, ethyl cellulose, carboxymethyl cellulose, and zein; and combinations thereof; with especially preferred film forming agents being hydroxypropyl cellulose and methyl cellulose.

Also further preferred is the composition further comprising the addition of an oil-soluble colorant, with said colorant present at a concentration of from about 0.01 to about 2 percent of said composition. Preferred oil-soluble colorants are β-carotene, oil soluble annatto and paprika oleoresin.

In another embodiment, the present invention is directed to a foodstuff containing the composition of the present invention, with preferred foodstuffs being poultry, beef, fish, cheeses, pasta, fruits, vegetables, marshmallows, baked goods, and pork, and being cooked by microwave radiation or by a conventional oven.

In a further embodiment, the present invention is directed to a process for imparting a brown color to uncooked foods comprising:

(a) providing an uncooked or partially cooked food having a surface;

(b) applying an edible coloring composition onto said surface, said coloring composition comprising
 (i) a dispersed phase consisting essentially of a colorant or a colorant substantially dissolved or dispersed in a substantially oil-immiscible medium;
 (ii) a continuous phase consisting essentially of an edible fat or a oil; and (c) cooking said treated foodstuff for a period of time sufficient to cook said foodstuff.

Preferred is the process wherein said colorant is present at a concentration of from about 0.05 to about 10 percent by weight of said composition, preferably at from about 0.2 to about 6 percent by weight of said composition.

Preferred also is the process wherein said colorant is selected from the group consisting of caramel, paprika, food grade dyes, beet powder, carmine, water-soluble annatto, turmeric, and saffron; and combinations thereof; with a preferred colorant being caramel.

Further preferred is the process wherein said fat or oil is present at a concentration of from about 10 to about 99 percent by weight of said composition, preferably at from about 40 to about 70 percent by weight of said composition.

Especially preferred is the process wherein said fat or oil is selected from the group consisting of canola oil, soybean oil, corn oil, olive oil, peanut oil, safflower oil, sunflower oil, vegetable oil, partially hydrogenated vegetable oils, animal fats, and milkfat; and combinations thereof; with preferred fats or oils being canola oil and soybean oil.

Also especially preferred is the process wherein said composition further comprises an emulsifier, with preferred emulsifiers selected from the group consisting of mono- and diglycerides and diacetyltartaric acid esters of mono- and diglycerides; and combinations thereof; with said emulsifier present at a concentration of from about 0.1 to about 10 percent, preferably at from about 1 to about 8 percent.

Also especially preferred is the process wherein said composition further comprises a viscosifying agent, preferably with said viscosifying agent present at a concentration of from about 0.01 to about 1 percent by weight of said composition, more preferably at an amount of from about 0.05 to about 0.4 percent by weight of said composition.

Further preferred is the process wherein said viscosifying agent is selected from the group consisting of xanthan gum, guar gum, starch, flour, gelatin, pectin, agar, carrageenan, locust bean gum, methyl cellulose, alginates, hydroxypropyl cellulose, hydroxypropylmethyl cellulose, carboxymethyl cellulose, ethyl cellulose and methylethyl cellulose; and combinations thereof; with especially preferred viscosifying agents being xanthan gum, guar gum, and starch.

Especially preferred is the process wherein said composition further comprises a film-forming agent, with said film-forming agent present at a concentration of from about 0.01 to about 1.0 percent by weight of said composition, preferably at of from about 0.05 to about 0.4 percent by weight of said composition.

More especially preferred is the process wherein said film-forming agent is selected from the group consisting of hydroxypropyl cellulose, methyl cellulose, arabinogalactan, zein, hydroxypropylmethyl cellulose, ethyl cellulose; carboxymethyl cellulose; and combinations thereof; with preferred film forming agents being hydroxypropyl cellulose and methyl cellulose.

Still further especially preferred is the process further comprising the addition of an oil-soluble colorant to the composition of the present invention, with the oil-soluble colorant present at a concentration of from about 0.01 to about 2 percent of said composition. Preferred oil-soluble colorants are B-Carotene, oil-soluble annatto, and paprika oleoresin; and combinations thereof.

In a further embodiment, the present invention is directed to a process wherein said foodstuff is poultry, beef, fish, cheeses, fruits, vegetables, pasta, marshmallows, baked goods, or pork, with said cooking accomplished by microwave radiation or in a conventional oven.

DETAILED DESCRIPTION OF THE INVENTION

In one embodiment, the present invention is directed to an edible composition for imparting a brown color to foods cooked by microwave radiation or by conventional means. The composition will not substantially alter the color of the food surface before cooking, and upon microwaving or heating by conventional means, a brown color is developed. The initial brown color is disguised by the use of a carrier. Upon cooking, the composition releases the desired color. Thus, the composition when applied does not substantially alter the surface color before cooking.

The composition comprises a dispersed phase containing the colorant and a continuous phase consisting essentially of a fat or oil.

The dispersed phase consists essentially of a colorant or a colorant substantially dissolved or dispersed in a substantially oil-immiscible medium. In those cases where the colorant is a liquid, it either by itself or dissolved in the substantially oil-immiscible medium will constitute the dispersed phase. In those instances where the colorant is a solid, it may be dispersed directly in the fat or oil comprising the continuous phase of the composition. Alternatively, it may be dissolved or dispersed in the substantially oil-immiscible medium which is itself dispersed in the continuous phase.

By the term "substantially oil-immiscible medium" is meant a medium which is substantially insoluble in the fat or oil which forms the continuous phase of the composition, and forms a separate phase dispersed in said fat or oil. It will be appreciated by those skilled in the art that said medium and said fat or oil can have a low degree of mutual solubility and still form a multiphase system. A preferred oil-immiscible medium is water.

In the composition of the present invention, the colorant may be present at a concentration of from about 0.05 to about 10 percent by weight, preferably from about 0.2 to about 10 percent by weight.

The edible colorant is chosen so that upon cooking, the desired color, preferably a shade of orange, red, yellow, or brown, is achieved. Examples of colorants which fulfill this criterion are caramel, paprika, food grade dyes, beet powder, carmine, water soluble annatto, turmeric, and saffron. Combinations of the above colorants may also be used. An especially preferred colorant is caramel. All these colorants are commercially available.

It will be appreciated by those skilled in the art to which this invention applies that some colorants, while substantially insoluble in the oil or fat which comprises the continuous phase of the present composition, contain oil-soluble components which may impart a color to said oil or fat phase. The resulting composition will impart a color to the uncooked food to which it is applied. Although less intense than the brown color which develops upon cooking, this visible color may be desirable since it may enhance the natural color of the uncooked food. In fact, in some cases such as when the uncooked food has an unappealing pale color, it has been found useful to add an oil-soluble colorant to the composition of the present invention.

In these cases, whenever the oil-soluble colorant is used, it is present at a concentration of from about 0.01 to about 2 percent of the composition of the present invention. Examples of oil-soluble colorants are paprike oleoresin, $\beta$-carotene and oil-soluble annatto. Combinations of the above colorants may also be used.

The fat or oil which comprises the continuous phase of the composition of the present invention can be any edible fat or oil. The edible fat or oil may be present at from about 10 to about 99 percent by weight, preferably at from about 40 to about 70 percent by weight. Non-limiting examples of preferred fats or oils which may be used are canola oil, soybean oil, corn oil, olive oil, peanut oil, safflower oil, sunflower oil, vegetable oil, partially hydrogenated vegetable oils, animal fats, and milkfats. Combinations of the above fats or oils may also be used. Preferred fats or oils are canola oil and soybean oil.

In some cases, it has been found useful to add an emulsifier to the composition of the present invention. If added, preferred emulsifiers are mono- and diglycerides and diacetyltartaric acid esters of mono- and diglycerides. If added, the emulsifier is present at a concentration of from about 0.5 to about 10 percent, preferably at from about 1 to 8 percent. Combinations of the above emulsifiers may also be used.

To impart further viscosity, if desired, to the composition, a viscosifying agent, at a concentration of from about 0.01 to about 1 percent by weight, preferably from about 0.05 to about 0.4 percent by weight, may also be added to the composition of the present invention. Preferred viscosifying agents are xanthan gum, guar gum, starch, flour, gelatin, pectin, agar, carrageenan, alginates, locust bean gum, methyl cellulose, hydroxypropyl cellulose, hydroxypropylmethyl cellulose, carboxymethyl cellulose, ethyl cellulose, and methylethyl cellulose; and combinations thereof. Especially preferred viscosifying agents are xanthan gum, guar gum, and starch.

In some cases, a film-forming agent may be added to the composition of the present invention. While not wishing to be bound by theory, it is believed that the film-forming agent enhances adhesion of the compositions to foods and/or allows for adjustment of luster and moisture of the cooked foods. Those skilled in the art to which this invention applies will appreciate that some viscosifying agents also have a film-forming function. One skilled in the art would further appreciate that these functions may be balanced by routine procedures, e.g. adjustment of concentrations. If added, the film-forming agent is present at a concentration of from about 0.01 to about 1.0 percent by weight, preferably at from about 0.05 to about 0.4 percent by weight. Preferred film-forming agents are hydroxypropyl cellulose, methyl cellulose, arabinogalactan, hydroxypropyl methyl cellulose, ethyl cellulose, carboxymethyl cellulose and zein. Combinations of the above may also be used.

The composition of the present invention may be used on a variety of foodstuffs. Non-limiting examples of foodstuffs include poultry, baked goods, pork, fish, beef, cheeses, fruits, vegetables, pasta and marshmallows.

While the composition of the present invention is especially suitable for imparting a brown color to foods cooked by microwave radiation, it has also surprisingly been found that it can be used on foods cooked by conventional means. For instance, the composition may be applied to frozen TV dinners or pot pies and when these frozen dinners or pot pies are heated in a conventional oven, for example, a desirable brown color is achieved without overbrowning.

In another embodiment, the present invention is also directed to a process for using the composition of the present invention to impart a brown color to foods. The composition is applied to an uncooked food and the food cooked for a period of time to achieve the desired brown color.

In the process of the present invention, the composition used is that previously described in relation to ingredients and amount of ingredients.

The invention having been described in general terms, reference is now made to specific Examples. It is to be understood that these Examples are not meant to limit the present invention, the scope of which is determined by the appended claims.

EXAMPLE 1

Emulsion of Caramel in Canola Oil

A mixture of 5.0 grams of a 1% aqueous solution of Keltrol (Kelco Division of Merck and Co. xanthan gum), 215 grams of water, and 1.5 grams of Sethness RT #175 caramel powder was stirred until homogeneous. A solution of emulsifier in oil was prepared by heating 97.7 grams of canola oil to 70° C. and adding 2.3 grams of Panodan ® 150 emulsifier (Grindsted Products, Inc.) with stirring. To 22.0 grams of the resulting solution at approximately 35° C., the caramel solution was added with stirring, and stirring was continued for 3 minutes.

EXAMPLE 2

Emulsion of Caramel in Canola Oil

A mixture of 2.5 grams of a 1% aqueous solution of Klucel HF (Aqualon Co. hydroxypropyl cellulose), 2.5 grams of a 1% aqueous solution of Keltrol (Kelco Division of Merck and Co. xanthan gum), 21.5 grams of water, and 1.5 grams of Sethness RT #220 caramel powder was stirred until homogeneous. A solution of emulsifier in oil was prepared by heating 97.7 grams of canola oil to 70° C. and adding 2.3 grams of Panodan ® 150 emulsifier (Grindsted Products, Inc.) with stirring. To 22.0 grams of the resulting solution at approximately 35° C., the caramel solution was added with stirring, and stirring was continued for 3 minutes.

EXAMPLE 3

Emulsion of Caramel in Canola Oil

A mixture of 2.5 grams of a 1% aqueous solution of Klucel HF (Aqualon Co. hydroxypropyl cellulose), 2.5 grams of a 1% aqueous solution of Keltrol (Kelco Division of Merck and Co. xanthan gum), 18.5 grams of water, and 1.5 grams of Sethness RT #175 caramel powder was stirred until homogeneous. A solution of emulsifier in oil was prepared by heating 98.0 grams of canola oil to 70° C. and adding 2.0 grams of Panodan ® 150 emulsifier (Grindsted Products, Inc.) with stirring. To 25.0 grams of the resulting solution at approximately 35° C., the caramel solution was added with stirring, and stirring was continued for 3 minutes.

EXAMPLE 4

Emulsion of Caramel in Canola Oil

A mixture of 5.0 grams of a 1% aqueous solution of guar gum, 21.5 grams of water, and 1.5 grams of Sethness RT #175 caramel powder was stirred until homogeneous. The resulting mixture was added with stirring to 22.0 grams of a 13.6% solution of Dur-Em 117 emulsifier (Durkee Industrial Foods Corp.) in canola oil at 35° C., and stirring was continued for 3 minutes.

EXAMPLE 5

Emulsion of Caramel in Canola Oil

A mixture of 5.0 grams of a 1% aqueous solution of Keltrol (Kelco Division of Merck and Co. xanthan gum), 20.0 grams of water, and 1.5 grams of Sethness RT #175 caramel powder was stirred until homogeneous. The resulting mixture was added with stirring to 23.5 grams of a 6.38% solution of Dur-Em 117 emulsifier (Durkee Industrial Foods Corp.) in canola oil at 35° C., and stirring was continued for 3 minutes.

EXAMPLE 6

Dispersion of Caramel and Paprika in Canola Oil

A mixture of 10.0 grams of a 0.5% aqueous solution of Keltrol (Kelco Division of Merck and Co. xanthan gum) 15.75 grams of water, 1.5 grams of Sethnesss RT #175 caramel powder, and 0.75 grams of ground paprika was stirred until homogeneous. The resulting mixture was added with stirring to 22.0 grams of a 2.3% solution of Panodan ® 150 emulsifier (Grindsted Products, Inc.) in canola oil at 35° C., and stirring was continued for 3 minutes.

EXAMPLE 7

Emulsion of Caramel and Red Food Coloring in Canola Oil

A mixture of 2.5 grams of a 1.0% aqueous solution of Keltrol (Kelco Division of Merck and Co. xanthan gum), 25.3 grams of water, 1.5 grams of Sethness RT #175 caramel powder, and 0.1 grams of Chroma Tone DDB7615-R red food coloring (Crompton and Knowles Corp.) was stirred until homogeneous. The resulting mixture was added with stirring to 22.0 grams of a 2.3% solution of Panodan ® 150 emulsifier (Grindsted Products, Inc.) in canola oil at 35° C., and stirring was continued for 3 minutes.

EXAMPLE 8

Application of Caramel-Canola Oil Emulsion to Chicken

The emulsion of Example 1 was sprayed onto the surface of raw, boneless, skinless chicken at levels of 0.5 and 1.0 gram of emulsion per 100 grams of chicken. The treated chicken samples and an untreated control were cooked separately in 700-watt microwave ovens at full power for one minute per 40 grams of chicken. Samples were allowed to cool uncovered for one hour at room temperature, then submitted to a 30-person panel for evaluation. The panel found the brown appearance of the treated samples preferable to that of the untreated microwave-cooked control. Asked to rate taste of the microwave-cooked samples, the panel clearly preferred the treated samples. On a scale ranging from 1 (dislike extremely) to 9 (like extremely), average scores were 6.2 for both treated samples, and 5.2 for the untreated sample. No negative flavor notes were reported by the panel.

EXAMPLE 9

Application of Caramel-Canola Oil Emulsion to Chicken

The emulsion of Example 2 was sprayed onto the surface of raw, boneless, skinless chicken at levels of 0.5 and 1.0 gram of emulsion per 100 grams of chicken. The treated chicken samples and an untreated control were cooked separately in 700-watt microwave ovens at full power for one minute per 40 grams of chicken. Samples were allowed to cool uncovered for one hour at room temperature, then submitted to a 30-person panel for evaluation. The panel found the brown appearance of the treated samples preferable to that of the untreated microwave-cooked control. No negative flavor notes were reported by the panel.

EXAMPLE 10

Application of Caramel-Canola Oil Emulsion to Frozen Pot Pie

One gram of the emulsion of Example 1 was sprayed onto the surface of a commercial 10-ounce frozen chicken pot pie, imparting a light tan coloration to the pie crust. The pie was cooked in a microwave oven for 9 minutes, in accord with package directions. The crust of the cooked pie had a golden brown color similar to that of an untreated pie which had been cooked in a conventional oven.

EXAMPLE 11

Application of Caramel-Canola Oil Emulsion to Chicken

One gram of the emulsion of Example 4 was sprayed onto a piece (about 170 grams) of raw, boneless, skinless chicken, imparting a natural light brown coloration to the surface. The chicken was cooked in a 700-watt microwave oven for about 5 minutes. The cooked chicken had a golden brown color similar to that of chicken cooked in a conventional oven.

EXAMPLE 12

Application of Caramel-Canola Oil Emulsion to Chicken

One gram of the emulsion of Example 5 was sprayed onto a piece (about 170 grams) of raw, boneless, skinless chicken, imparting a natural light brown coloration to the surface. The chicken was cooked in a 700-watt microwave oven for about 5 minutes. The cooked chicken had a golden brown color similar to that of chicken cooked in a conventional oven.

EXAMPLE 13

Application of Caramel-Paprika-Canola Oil Dispersion to Pork

One gram of the dispersion of Example 6 was sprayed onto a 145-gram raw pork cutlet, imparting a natural light brown color to the surface. The pork cutlet was cooked in a 700-watt microwave oven for 3.5 minutes. The cooked meat had a dark brown color similar to that of a pork cutlet cooked in a conventional oven.

EXAMPLE 14

Application of Caramel-Food Coloring Canola Oil Emulsion to Pork

One gram of the emulsion of Example 7 was sprayed onto a 145-gram piece of raw pork cutlet, imparting a natural light brown color to the surface. The pork cutlet was cooked in a 700-watt microwave oven for 3.5 minutes. The cooked meat had a dark brown color similar to that of a pork cutlet cooked in a conventional oven.

EXAMPLE 15

Application of Caramel-Canola Oil Emulsion to Chicken with a Seasoning Blend

The emulsion of Example 1 was sprayed onto the surface of raw, boneless, skinless chicken at a level of 0.5 gram of emulsion per 100 grams of chicken. A seasoning blend of 20% w/w onion powder, 20% w/w garlic powder, and 60% w/w salt was then sprinkled onto the chicken at a level of 0.5 gram of the blend per 100 grams of chicken. The treated chicken samples and a control treated with the seasoning blend alone were cooked in a 700-watt microwave oven at full power for one minute per 40 grams of chicken. Samples were allowed to cool uncovered for one hour at room temperature, then submitted to a 30-person panel for evaluation. On a scale ranging from 1 (dislike extremely) to 9 (like extremely), the panel found the taste of the emulsion-treated chicken acceptable and equal to that of the controls. Average scores were 6.3 for the treated samples, and 6.0 for the controls.

EXAMPLE 16

Cooking of Treated Chicken in a Conventional Oven

Chicken treated as described in Example 15 and controls treated with the seasoning blend only were broiled under identical conditions in a conventional oven, allowed to cool uncovered for one hour at room temperature, then submitted to a 30-person panel for evaluation. On a scale ranging from 1 (dislike extremely) to 9 (like extremely), the panel found the taste of the emulsion-treated chicken acceptable and equal to that of the controls. Average scores were 6.4 for the treated samples, and 6.1 for the controls.

EXAMPLE 17

Dispersion of Caramel Powder in Canola Oil

A mixture of 1.5 grams of Sethness RT #175 caramel powder and 23.5 grams of canola oil was blended for 5 minutes in a Waring blender at medium speed. The caramel particles remained in suspension for about 30 minutes, which was adequate to permit testing the dispersion on food.

EXAMPLE 18

Application of Caramel-Canola Oil Dispersion to Chicken

The freshly-prepared dispersion of Example 17 was sprayed onto raw, boneless, skinless chicken at a level of about 1 gram of dispersion per 185 grams of chicken, imparting a natural light brown coloration to the surface. The chicken was cooked in a 500-watt microwave oven for about 10 minutes. The cooked chicken had a golden brown color similar to that of chicken cooked in a conventional oven.

EXAMPLE 19

Emulsion of Caramel in Canola Oil with Oil-Soluble Annatto

A mixture of 2.5 grams of a 1% aqueous solution of Keltrol (Kelco Division of Merck and Co. xanthan gum), 24.0 grams of water, 1.5 grams of dry caramel powder, and 0.05 grams of O.S. Annatto (Crompton and Knowles Corp. oil-soluble annatto) was stirred until a homogeneous emulsion was obtained. A solution of emulsifier in oil was prepared by heating 97.7 grams of canola oil to 70° C. and adding 2.3 grams of Panodan 150 emulsifier (Grindsted Products, Inc.) with stirring. To 22.0 grams of the resulting solution at approximately 35° C., the caramel-annatto emulsion was added with stirring, and stirring was continued for 3 minutes.

EXAMPLE 20

Application of Caramel-Annatto-Canola Oil Emulsion to Frozen Pot Pie

One gram of the emulsion of Example 19 was sprayed onto the surface of a commercial 10-ounce frozen chicken pot pie, imparting a light tan coloration to the pie crust. The pie was cooked in a microwave oven for 9 minutes, in accord with package directions. The crust of the cooked pie had a golden brown color similar to that of an untreated pie which had been cooked in a conventional oven.

We claim:

1. An edible composition comprising
   (a) a dispersed phase consisting essentially of a colorant or a colorant substantially dissolved or dispersed in a substantially oil-immiscible medium; and
   (b) a continuous phase consisting essentially of a edible fat or oil;
   said composition substantially colorless when applied to food and releasing said colorant upon cooking of a food to which said colorant is applied so as to impart a brown color to the food.

2. A composition according to claim 1 wherein said colorant is present at a concentration of from about 0.05 to about 10 percent by weight.

3. A composition according to claim 2 wherein said colorant is present at a concentration of from about 0.2 to about 6 percent by weight.

4. A composition according to claim 1 wherein said colorant is selected from the group consisting of caramel, paprika, food grade dyes, beet powder, carmine, water-soluble annatto, turmeric, and saffron; and combinations thereof.

5. A composition according to claim 4 wherein said colorant is caramel.

6. A composition according to claim 1 wherein said fat or oil is present at a concentration of from about 10 to about 99 percent by weight.

7. A composition according to claim 6 wherein said fat or oil is present at a concentration of from about 40 to about 70 percent by weight.

8. A composition according to claim 1 wherein said fat or oil is selected from the group consisting of canola oil, soybean oil, corn oil, olive oil, peanut oil, safflower oil, sunflower oil, vegetable oil, partially hydrogenated vegetable oils, animal fats, and milkfat; and combinations thereof.

9. A composition according to claim 8 wherein said fat or oil is canola oil.

10. A composition according to claim 8 wherein said fat or oil is soybean oil.

11. A composition according to claim 1 further comprising the addition of an emulsifier.

12. A composition according to claim 11 wherein said emulsifier is present at a concentration of from about 0.1 to about 10 percent by weight.

13. A composition according to claim 12 wherein said emulsifier is present at from about 1 to about 8 percent by weight.

14. A composition according to claim 11 wherein said emulsifier is selected from the group consisting of mono- and diglycerides, and diacetyltartaric acid esters of mono- and diglycerides; and combinations thereof.

15. A composition according to claim 1 further comprising the addition of a viscosifying agent.

16. A composition according to claim 15 wherein said viscosifying agent is present at a concentration of from about 0.01 to about 1 percent by weight.

17. A composition according to claim 16 wherein said viscosifying agent is present at a concentration of from about 0.05 to about 0.4 percent by weight.

18. A composition according to claim 15 wherein said viscosifying agent is selected from the group consisting of xanthan gum, guar gum, starch, flour, gelatin, pectin, agar, carrageenan, alginates, locust bean gum, methyl cellulose, hydroxypropyl cellulose, hydroxypropylmethyl cellulose, carboxymethyl cellulose, ethyl cellulose and methylethyl cellulose; and combinations thereof.

19. A composition according to claim 18 wherein said viscosifying agent is xanthan gum.

20. A composition according to claim 18 wherein said viscosifying agent is guar gum.

21. A composition according to claim 18 wherein said viscosifying agent is starch.

22. A composition according to claim 1 further comprising the addition of a film-forming agent.

23. A composition according to claim 22 wherein said film-forming agent is present at a concentration of from about 0.01 to about 1 percent by weight.

24. A composition according to claim 23 wherein said film-forming agent is present at a concentration of from about 0.05 to about 0.4 percent by weight.

25. A composition according to claim 22 wherein said film-forming agent is selected from the group consisting of hydroxypropyl cellulose, methyl cellulose, arabinogalactan, hydroxypropylmethyl cellulose, ethyl cellulose, carboxymethyl cellulose, and zein; and combinations thereof.

26. A composition according to claim 25 wherein said film-forming agent is hydroxypropyl cellulose.

27. A composition according to claim 25 wherein said film-forming agent is methyl cellulose.

28. A composition according to claim 1 further comprising the addition of an oil-soluble colorant.

29. A composition according to claim 28 wherein said colorant is present at a concentration of from about 0.01 to about 2 percent of said composition.

30. A composition according to claim 28 wherein said oil-soluble colorant is selected from the group consisting of paprika oleoresin, B-carotene and oil-soluble annatto; and combinations thereof.

31. A foodstuff containing the composition of claim 1.

32. A foodstuff according to claim 31 wherein said foodstuff is selected from the group consisting of poultry, beef, baked goods, pork, cheeses, pasta, fruits, vegetables, fish, and marshmallows.

33. The composition of claim 1 wherein said cooking is accomplished by microwave radiation.

34. The composition of claim 1 wherein said cooking is accomplished in a conventional oven.

35. A process for imparting a brown color to uncooked foodstuff comprising:
   (a) providing an uncooked or partially cooked food having a surface;
   (b) applying an edible coloring composition onto said surface, said coloring composition comprising
      (i) a dispersed phase consisting essentially of a colorant or a colorant substantially dissolved or dispersed in a substantially oil-immiscible medium;
      (ii) a continuous phase consisting essentially of an edible fat or oil; and
   (c) cooking said treated foodstuff for a period of time sufficient to cook said foodstuff.

36. A process according to claim 35 wherein said colorant is present at a concentration of from about 0.05 to about 10 percent by weight of said composition.

37. A process according to claim 36 wherein said colorant is present at a concentration of from about 0.2 to about 6 percent by weight of said composition.

38. A process according to claim 35 wherein said colorant is selected from the group consisting of caramel, paprika, food grade dyes, beet powder, carmine, water-soluble annatto, turmeric, and saffron; and combinations thereof.

39. A process according to claim 38 wherein said colorant is caramel.

40. A process according to claim 35 wherein said fat or oil is present at a concentration of from about 10 to about 99 percent by weight of said composition.

41. A process according to claim 40 wherein said fat or oil is present at a concentration of from about 40 to about 70 percent by weight of said composition.

42. A process according to claim 35 wherein said fat or oil is selected from the group consisting of canola oil, soybean oil, corn oil, olive oil, peanut oil, safflower oil, sunflower oil, vegetable oil, partially hydrogenated vegetable oils, animal fats, and milkfat; and combinations thereof.

43. A process according to claim 42 wherein said fat or oil is canola oil.

44. A process according to claim 42 wherein said fat or oil is soybean oil.

45. A process according to claim 35 wherein said composition further comprises an emulsifier.

46. A process according to claim 45 wherein said emulsifier is present at a concentration of from about 0.1 to about 10 percent by weight of said composition.

47. A process according to claim 46 wherein said emulsifier is present at a concentration of from about 1 to about 8 percent by weight of said composition.

48. A process according to claim 45 wherein said emulsifier is selected from the group consisting of mono- and diglycerides, and diacetyltartaric acid esters of mono- and diglycerides; and combinations thereof.

49. A process according to claim 35 wherein said composition further comprises a viscosifying agent.

50. A process according to claim 49 wherein said viscosifying agent is present at a concentration of from about 0.01 to about 1 percent by weight of said composition.

51. A process according to claim 50 wherein said viscosifying agent is present at a concentration of from about 0.05 to about 0.4 percent by weight of said composition.

52. A process according to claim 49 wherein said viscosifying agent is selected from the group consisting of xanthan gum, guar gum, starch, flour, gelatin, pectin, agar, carrageenan, locust bean gum, methyl cellulose, alginates, hydroxypropyl cellulose, hydroxypropylmethyl cellulose, carboxymethyl cellulose, ethyl cellulose and methylethyl cellulose; and combinations thereof.

53. A process according to claim 52 wherein said viscosifying agent is xanthan gum.

54. A process according to claim 52 wherein said viscosifying agent is guar gum.

55. A process according to claim 52 wherein said viscosifying agent is starch.

56. A process according to claim 35 wherein said composition further comprises a film-forming agent.

57. A process according to claim 56 wherein said film-forming agent is present at a concentration of from about 0.01 to about 1 percent by weight of said composition.

58. A process according to claim 57 wherein said film-forming agent is present at a concentration of from about 0.05 to about 0.4 percent by weight of said composition.

59. A process according to claim 56 wherein said film-forming agent is selected from the group consisting of hydroxypropyl cellulose, methyl cellulose, arabinogalactan, zein, hydroxypropylmethyl cellulose, ethyl cellulose and carboxymethyl cellulose; and combinations thereof.

60. A process according to claim 59 wherein said film-forming agent is hydroxypropyl cellulose.

61. A process according to claim 59 wherein said film-forming agent is methyl cellulose.

62. A process according to claim 35 wherein said composition further comprises an oil-soluble colorant.

63. A process according to claim 62 wherein said colorant is present at a concentration of from about 0.01 to about 2 percent of said composition.

64. A process according to claim 62 wherein said colorant is selected from the group consisting of paprika oleoresin, $\beta$-carotene, and oil-soluble annatto; and combinations thereof.

65. A process according to claim 35 wherein said foodstuff is selected from the group consisting of poultry, beef, baked goods, fish, pasta, cheeses, pork, fruits, vegetables, and marshmallows.

66. A process according to claim 35 wherein said cooking is accomplished by microwave radiation.

67. A process according to claim 35 wherein said cooking is accomplished in a conventional oven.

* * * * *